Patented Sept. 6, 1932

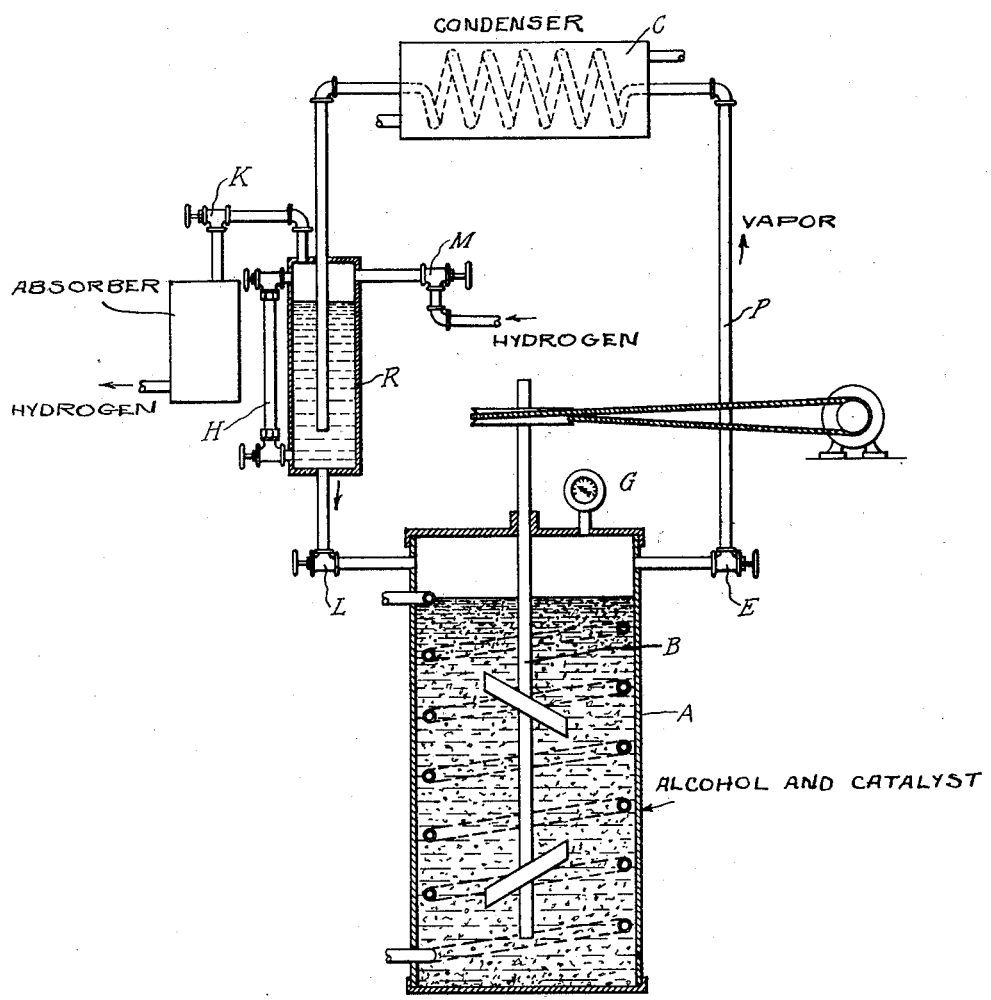

1,875,540

UNITED STATES PATENT OFFICE

JOHN C. WOODRUFF, JEROME MARTIN, AND IGNACE J. KRCHMA, OF TERRE HAUTE, INDIANA, ASSIGNORS TO COMMERCIAL SOLVENTS CORPORATION, OF TERRE HAUTE, INDIANA, A CORPORATION OF MARYLAND

PRODUCTION OF ESTERS

Application filed November 15, 1928. Serial No. 319,724.

Our invention relates to a method of preparing esters from alcohols by the aid of catalysts. More particularly, our process relates to an improved method of effecting the conversion of primary alcohols into esters such as ethyl acetate, butyl butyrate, ethyl butyrate, etc., said conversation being carried out in the liquid phase.

In United States Patents Nos. 1,817,898 and 1,817,899, granted August 4, 1931, processes and catalysts suitable for converting primary alcohols into esters are described. These applications, however, relate more specifically to methods of effecting the desired reactions in the vapor phase. We have now discovered a method of carrying out the same reaction in the liquid phase using the same types of catalysts previously described in the above-mentioned applications, which has a number of advantages over the vapor phase process.

The formation of esters from alcohols under the influence of certain catalysts at high temperatures may be regarded as taking place as follows:

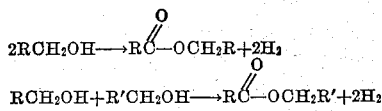

For R and R' radicals such as methyl, ethyl, propyl, butyl, isobutyl, etc., may be substituted. It will be noted also that when treating a single alcohol by our process, an ester such as ethyl acetate, propyl propionate butyl butyrate, etc. is obtained. When two different alcohols such as ethyl alcohol and butyl alcohol are taken, a mixture of esters, i. e., ethyl acetate, butyl butyrate, ethyl butyrate, and butyl acetate is obtained.

While we do not know the exact mechanism of the reaction, it appears that the alcohol may be first dehydrogenated into the corresponding aldehyde, two molecules of which, under certain conditions, then condense to form an ester. This theory is at least partially corroborated by the fact that Tistschenko (Jour. Russ. Phys. Chem. Soc. 38, ii, 355—418, 482—550) found that it was possible to obtain esters such as ethyl acetate from acetaldehyde or propyl propionate from propaldehyde by the use of an aluminum alkoxide catalyst. More recently, modifications of this process have been patented by Imray (British Patent 1288—1915), and Mugdan and Herrmann (U. S. Patent 1,459,852). We have found, however, that when an aldehyde and an alcohol are separately treated under similar operating conditions with catalysts of the character hereinafter described, much lower yields of esters are obtained from the aldehyde than from the corresponding alcohol. We have also found that the amount of high-boiling material other than ester, formed during the condensation process is greatly reduced by the use of an alcohol as the raw material.

In carrying out our liquid phase process of converting aliphatic alcohols to esters we prefer to employ as the agents effecting the desired reactions, catalysts of the character previously described in U. S. Patents Nos. 1,817,898 and 1,817,899, granted August 4, 1931. We may, however, also use other catalysts recommended as suitable for obtaining the desired result. U. S. Patent No. 1,817,899 describes generally catalysts comprising initially a metal uranyl compound, a silver compound or metallic silver, a metal or a compound of a metal found in the first long period of the periodic table. If desired, a hardening agent selected from hydroxides of elements found in Groups II$b$ to IV inclusive of the periodic table may also be incorporated with the catalyst. Examples of this type of catalyst are shown below.

Table I

| Catalyst number | Initial composition of catalyst |
|---|---|
| 1 | $Ba_2UO_2(CO_3)_3.Ag_2CO_3.1/10NiCO_3$ |
| 2 | $Ba_2UO_2(CO_3)_3.Ag_2CO_3.3/10NiCO_3.2Al(OH)_3$ |
| 3 | $Ca_2UO_2(CO_3)_3.Ag_2CO_3.Co(OH)_2.Al(OH)_3$ |
| 4 | $Zn_2UO_2(CO_3)_3.Ag.Cu.Be(OH)_2$ |

U. S. Patent No. 1,817,898, granted August 4, 1931 describes catalysts suitable for the same purpose, which comprise initially metal uranyl compounds and silver compounds or metallic silver. As in the above case, hardening agents of a similar character may be incorporated with the catalyst, if desired. Examples of this type of catalyst are shown in Table II below.

Table II

| Catalyst number | Initial composition of catalyst |
|---|---|
| 5 | $ZnUO_2(CO_3)_3.1/2Ag_2CO_3$ |
| 6 | $BaUO_2(CO_3)_3.Ag.Al(OH)_3$ |
| 7 | $BaUO_2(CO_3)_3.Ag_2CO_3.Th(OH)_4$ |

It should be pointed out that in our improved liquid phase process, the necessity for hard granular catalyst is no longer present and consequently the hardening agent, i. e., hydroxides of elements found in Groups IIb to IV inclusive of the periodic table may be omitted from the catalyst mixture.

Whatever catalyst is employed is preferably powdered sufficiently to pass a 50 mesh screen. Finer catalyst material gives better and more rapid conversions but is somewhat more difficult to efficiently separate from the resulting reaction product. The amount of catalyst to be used is largely determined by the cost of the catalyst, its activity and the speed of reaction desired. We have found that proportions of 3–6% of catalyst by weight give satisfactory results under ordinary operating conditions.

One method of carrying out our improved liquid phase process of obtaining esters from primary alcohols is as follows: An alcohol together with a suitable amount of the selected catalyst is placed in a closed vessel capable of withstanding the pressure arising from the combined effect of the vapor pressures of the liquids evolved at the temperature of the reaction, and the pressure of the hydrogen and any other gas which may be produced during the reaction. The apparatus should be provided with a device for heating and with an agitator which should supply vigorous stirring. A propeller type stirrer, revolving at 300 R. P. M., has been found to give satisfactory results.

A suitable form of apparatus is represented in the accompanying drawing. This drawing is a diagrammatic representation of the apparatus in front elevation with certain parts shown in section. Referring to the drawing, A represents a pressure-resistant reaction vessel equipped with a heating coil, a stirring device B and a pressure gauge G. At the top of this vessel a vapor line P fitted with a valve E leads to a condenser C. A condensate line leads from the condenser to a receiver R equipped with a gauge glass, and a condensate line, fitted with a valve L, leading back to the reaction vessel. A gas line, for the purpose of introducing hydrogen under pressure to force the condensate back to the reaction vessel, enters the receiver above the normal liquid level. This line is fitted with a valve M. An exit gas line fitted with a valve K leads from the top of the receiver to an absorber for the purpose of removing non-condensable gases from the system and recovering by absorption the small amounts of valuable products carried by these gases.

The temperature to be used in the operation depends to some extent upon the critical temperature of the alcohol employed. In general, we find that we may use temperatures from about 230° C. to about 310° C. Temperatures above the latter value may be employed for alcohols having critical temperatures above 310° C. but these high temperatures are found to result in decreased yields due to formation of products other than esters. Excellent yields and fair conversions may be obtained at temperatures as low as 235° C.

As the temperature of this mixture of alcohol or alcohols and catalysts contained in the reaction vessel is raised, the formation of ester and the evolution of hydrogen begins. This builds up a pressure above the liquid which is suitably adjusted and maintained by purging off the hydrogen. For most purposes it is preferable to maintain in the reaction vessel a pressure up to 20 atmospheres in excess of that normally generated by the liquid at the operating temperature. In purging off the hydrogen, a small amount of reactant vapor is necessarily removed at the same time. This mixture of ester and unconverted alcohol is condensed and preferably returned to the converter for further treatment until the desired conversion has been effected.

One method of carrying out our new method of catalytically converting alcohols to esters is by making use of an apparatus similar to that shown in the accompanying diagram. The reaction vessel A is provided with a paddle agitator B, a gage G for registering the pressure produced by the vapors and gases evolved during the course of the reaction, and suitable means for heating, which may conveniently be steam or oil coils placed in or about the reaction vessel. The alcohol or alcohols and a suitable amount of appropriate catalyst are placed in the reaction vessel and the temperature raised to about 230°–310° C. while thoroughly agitating the mixture of alcohol and catalyst. When the reaction temperature is reached, hydrogen is evolved and the pressure increases. In order to prevent excessive pressures in the reaction vessel, the hot gases consisting chiefly of a mixture of hydrogen and vapors of the liquids in the converter are allowed to escape thru the valve E into the pipe P which is surrounded by a condenser C where the vapors are condensed. The condensed liquid and the gaseous hydrogen are then collected under the same pressure in the receiver R which is provided with a gage glass H. The hydrogen thus freed of the liquid vapors is expanded from the top of the receiver thru the valve K and then passed thru an activated charcoal absorber to remove the residual alcohol and ester vapors, and may be collected and utilized as desired. At intervals, the liquid collected in the receiver R is forced back into the converter A thru a return line from the bottom of the receiver. This is accomplished by closing the valves E and K and opening the valves L and M. The valve L connects the receiver with the converter and the valve M connects the receiver to a hydrogen cylinder or other source of hydrogen under higher pressure than being used in the operating system. The introduction of a small amount of hydrogen from this source serves to force the liquid in the receiver back into the converter. When the level of the liquid has been reduced to the desired extent, the valves M and L are closed and E and K opened and the operation continued until the desired degree of conversion of alcohol to esters has been attained.

When the operation is completed the liquid containing suspended catalyst is removed from the converter and the catalyst removed from the liquid by filtration or other suitable means. The recovered catalyst may then be returned to the converter for reuse with a fresh batch of alcohol and the operation continued until the catalyst decreases in activity to such a degree that it is no longer profitable to use it. At this point, the valuable ingredients of the catalyst are readily and cheaply recovered by treatment with dilute nitric acid and subsequent refinement and treatment of the nitric acid solution.

Normal butyl alcohol treated for six hours at 280° C. at a total pressure varying between 30–60 atmospheres with 6% by weight of catalyst #1 (described in Table I above) crushed sufficiently to pass a 65 mesh screen gave a 55% conversion. Distillation of the liquid resulting from the operations resulted in producing a fraction boiling between 160°–166° C. which had the following composition:

| | Per cent |
|---|---|
| Esters as butyl butyrate | 98.9 |
| Acidity as butyric acid | .3 |

More than 90% of the material boiling outside of the range 160°–165° C. was found to be unconverted normal butyl alcohol suitable for reuse in the process.

The hydrogen purged from the system during the operation is of excellent quality and requires little purification before being suitable for most purposes. A typical analysis of the expanded gas from a run with normal butyl alcohol is as follows:

| | Per cent |
|---|---|
| Hydrogen | 97.2 |
| Carbon dioxide | 1.2 |
| Carbon monoxide | 1.0 |
| Unsaturated hydrocarbons / Saturated hydrocarbons | .6 |

The liquid phase process of converting alcohols to esters has a number of distinct advantages over vapor phase methods. Since the reaction can be carried out at lower temperatures, the tendency for undesirable side reactions to take place is greatly reduced with the result that the yield is increased appreciably and at the same time esters of the highest purity obtained.

A number of factors make the process easier and more economical to operate. The liquid phase operation does not require vaporization of the liquid and hence heating costs are less. Another point of importance is the fact that the liquid is a better conductor of heat than the same material in the vapor form and hence heat is more readily supplied and distributed within the converter.

The liquid phase process has another important advantage over vapor phase processes in that catalysts of a different physical character may be employed. Since a readily prepared amorphous powder may be used, the problem of firmness and support which so often proves a serious and expensive problem in vapor phase processes, is eliminated. The easy and cheap method of preparing a powdered catalyst also makes it possible to employ a short-lived catalyst. The de-activated catalyst may be dissolved and reprecipitated at extremely low cost, an advantage which is not enjoyed by the vapor phase catalyst since in this latter type special and close attention must be paid to the details of drying and support.

Still another advantage which the liquid phase process has over the vapor phase process is the fact that in the former a unit weight of reactant occupies a smaller space and hence a smaller converter may be employed for the production of a given amount of ester.

Improved equilibrium conditions are also obtained in the liquid phase process. The hydrogen being in the gas phase and very little soluble in the liquid is automatically removed from the reaction zone upon its formation. The reaction is therefore favored and hence higher conversions may be obtained. In this way a higher concentration of ester results, thus simplifying the problem of isolating the ester from the final product.

While we have described above only the conversion of n-butyl alcohol to butyl butyrate, our new process of liquid phase conversion applies equally well to other primary alcohols such as ethyl, propyl, isoamyl, normal amyl, etc. or mixtures of such alcohols.

It is understood also that we do not confine ourselves to the use of this particular apparatus which has been cited above merely as an example of a suitable means of carrying out our new process. Our process relates generally to a method of converting primary alcohols to esters in the liquid phase by the aid of catalysts. The specific details of operation described above have been cited as illustrative only of our new process, and it will be understood that it is desired to embrace within the scope of this invention such modifications and changes as may be necessary to adapt it to varying conditions and uses.

This application is a continuation-in-part of our U. S. Serial No. 297,281, filed August 3, 1928.

Now having described our invention, what we claim as new and novel is:

1. In a process for converting primary alcohols containing more than one carbon atom into their corresponding esters, the step which which comprises subjecting said alcohols in the liquid phase at temperatures ranging from about 230° C. to about the critical temperature of the alcohol employed, to contact with catalysts of the type containing silver compounds or metallic silver and uranyl compounds of metals selected from the group consisting of calcium, barium, strontium, magnesium, zinc, silver and lead.

2. In a process for converting primary alcohols having more than one carbon atom into their corresponding esters, the step which comprises subjecting said alcohols in the liquid phase to the action of catalysts of the type containing silver compounds or metallic silver and a uranyl compound of a metal selected from the group consisting of calcium, barium, strontium, magnesium, zinc, silver, and lead, and a metal or a compound of a metal selected from the group consisting of copper, nickel, iron and cobalt, at temperatures ranging from about 230° C. to about the critical temperature of the alcohol employed.

3. In a process for converting primary alcohols containing more than one carbon atom into their corresponding esters, the step which comprises subjecting said alcohols in the liquid phase at temperatures ranging from about 230° C. to about the critical temperature of the alcohol employed, to contact with catalysts of the type containing silver compounds or metallic silver and a uranyl compound of a metal selected from the group consisting of calcium, barium, strontium, magnesium, zinc, silver and lead, and a hydroxide of a metal selected from the group consisting of aluminium, thorium, zirconium, and beryllium.

4. In a process for converting primary alcohols having more than one carbon atom into their corresponding esters, the step which comprises subjecting said alcohols in the liquid phase at temperatures ranging from about 230° C. to about the critical temperature of the alcohol employed, to the action of a catalyst of the type containing silver compounds or metallic silver and a uranyl compound of a metal selected from the group consisting of calcium, barium, strontium, magnesium, zinc, silver and lead, and a metal or a compound of a metal selected from the group consisting of copper, nickel, iron and cobalt and a hydroxide of a metal selected from the group consisting of aluminium, thorium, zirconium, and beryllium.

5. In a process for converting primary alcohols containing more than one carbon atom into their corresponding esters, the step which comprises subjecting said alcohols in the liquid phase at temperatures ranging from about 230° C. to about the critical temperature of the alcohol employed and at superatmospheric pressures, to contact with catalysts of the type containing silver compounds or metallic silver and uranyl compounds of metals selected from the group consisting of calcium, barium, strontium, magnesium, zinc, silver and lead.

6. In a process for converting primary alcohols containing more than one carbon atom into their corresponding esters, the step which comprises subjecting said alcohols in the liquid phase at temperatures ranging from about 230° C. to about the critical temperature of the alcohol employed and at superatmospheric pressures, to contact with catalysts of the type containing silver compounds or metallic silver and a uranyl compound of a metal selected from the group consisting of calcium, barium, strontium, magnesium, zinc, silver, and lead, and a metal or a compound of a metal selected from the group consisting of copper, nickel, iron and cobalt.

7. In a process for converting primary alcohols containing more than one carbon atom into their corresponding esters, the step which comprises subjecting said alcohols in the liquid phase at temperatures ranging from about 230° C. to about the critical temperature of the alcohol employed and at pressures up to approximately 20 atmospheres above the vapor pressure of the liquid in the reaction vessel at the temperature of the operation, to contact with catalysts of the type containing silver compounds or metallic silver and uranyl compounds of metals selected from the group consisting of calcium, barium, strontium, magnesium, zinc, silver and lead.

8. In a process for converting primary alcohols containing more than one carbon atom into their corresponding esters, the step which comprises subjecting said alcohols in the liquid phase at temperatures ranging from about 230° C. to about the critical temperature of the alcohol employed and at pressures up to approximately 20 atmospheres above the vapor pressure of the liquid in the reaction vessel at the temperature of the operation, to contact with catalysts of the type containing silver compounds or metallic silver and a uranyl compound of a metal selected from the group consisting of calcium, barium, strontium, magnesium, zinc, silver, and lead, and a metal or a compound of a metal selected from the group consisting of copper, nickel, iron and cobalt.

9. In a process for converting primary alcohols containing more than one carbon atom into their corresponding esters, the step which comprises agitating said alcohols in the liquid phase in a closed system with catalysts of the type containing silver compounds or metallic silver and uranyl compounds of metals selected from the group consisting of calcium, barium, strontium, magnesium, zinc, silver, and lead, at temperatures ranging from 230° C. to the critical temperature of the alcohol employed and at superatmospheric pressures, said pressures being regulated by bleeding off part of the gases evolved during the reaction.

10. In a process for converting primary alcohols containing more than one carbon atom into their corresponding esters, the step which comprises agitating said alcohols in the liquid phase in a closed system with catalysts of the type containing silver compounds or metallic silver and a uranyl compound of a metal selected from the group consisting of calcium, barium, strontium, magnesium, zinc, silver, and lead, and a metal or a compound of a metal selected from the group consisting of copper, nickel, iron and cobalt, at temperatures ranging from 230° C. to the critical temperature of the alcohol employed and at superatmospheric pressures, said pressures being regulated by bleeding off part of the gases evolved during the reaction.

11. In a process for converting n-butyl alcohol to butyl butyrate, the step which comprises subjecting n-butyl alcohol in the liquid phase to the action of catalysts of the type containing silver compounds or metallic silver and uranyl compounds of metals selected from the group consisting of calcium, barium, strontium, magnesium, zinc, silver, and lead, at temperatures from about 260° C. to about 290° C. and at pressures from about 30 to about 60 atmospheres.

12. In a process for converting n-butyl alcohol to butyl butyrate, the step which comprises subjecting n-butyl alcohol in the liquid phase to the action of catalysts of the type containing silver compounds or metallic silver and a uranyl compound of a metal selected from the group consisting of calcium, barium, strontium, magnesium, zinc, silver and lead, and a metal or a compound of a metal selected from the group consisting of copper, nickel, iron and cobalt, at temperatures from about 260° C. to about 290° C. and at pressures from about 30 to about 60 atmospheres.

In testimony whereof we affix our signatures.

JOHN C. WOODRUFF.
JEROME MARTIN.
IGNACE J. KRCHMA.